United States Patent
Park et al.

(10) Patent No.: US 8,592,718 B2
(45) Date of Patent: Nov. 26, 2013

(54) APPARATUS FOR FORMING PATTERN USING LASER

(75) Inventors: Deukil Park, Pyeongtaek-si (KR); Choongyop Rhew, Pyeongtaek-si (KR); Daisoung Park, Pyeongtaek-si (KR); Wonmyeong Kang, Pyeongtaek-si (KR)

(73) Assignee: LS Tech Co., Ltd., Gyeonggi-Do (KR)

( * ) Notice: Subject to any disclaimer, the term of this patent is extended or adjusted under 35 U.S.C. 154(b) by 806 days.

(21) Appl. No.: 12/834,167

(22) Filed: Jul. 12, 2010

(65) Prior Publication Data

US 2011/0010003 A1 Jan. 13, 2011

(30) Foreign Application Priority Data

Jul. 10, 2009 (KR) ................. 10-2009-0062800

(51) Int. Cl.
*B23K 26/02* (2006.01)
*B23K 26/08* (2006.01)

(52) U.S. Cl.
USPC ............. 219/121.78; 219/121.79; 219/121.8

(58) Field of Classification Search
USPC ............. 219/121.8, 121.62, 121.66, 121.69, 219/121.85, 121.78, 121.79; 425/174, 425/174.4; 264/1.37, 400, 482, 40.1; 362/623, 330; 700/108, 166; 347/224, 347/234
See application file for complete search history.

(56) References Cited

U.S. PATENT DOCUMENTS

| | | | |
|---|---|---|---|
| 5,889,252 A * | 3/1999 | Williams et al. | 219/121.54 |
| 6,697,096 B2 * | 2/2004 | Agorio | 347/261 |
| 2007/0032896 A1 * | 2/2007 | Ye et al. | 700/108 |

FOREIGN PATENT DOCUMENTS

| | | |
|---|---|---|
| KR | 10-1998-0008596 | 9/1998 |
| KR | 10-2000-0075525 | 3/2001 |
| KR | 10-2002-0028919 | 8/2002 |
| KR | 10-2001-0025870 | 11/2002 |
| KR | 20-2003-0016501 | 8/2003 |
| KR | 10-2002-0026023 | 11/2003 |
| KR | 10-2004-0029372 | 6/2004 |
| KR | 10-2005-0010952 | 5/2006 |
| KR | 10-2005-0057719 | 5/2006 |
| KR | 10-2005-0012612 | 8/2006 |
| KR | 10-2006-0049742 | 12/2007 |
| KR | 10-2007-0079064 | 11/2008 |

OTHER PUBLICATIONS

Translation of KR 10-2007-0115399 to Lee published on Dec. 6, 2007.*
Translation of KR 2002-0064227 to Park published on Aug. 7, 2002.*

* cited by examiner

*Primary Examiner* — Henry Yuen
*Assistant Examiner* — Michael Laflame, Jr.
(74) *Attorney, Agent, or Firm* — IPLA P.A.; James E. Bame

(57) ABSTRACT

An apparatus for forming a pattern using a laser is provided. The apparatus includes a pattern storing unit, a controller, a laser oscillating unit, an X-Y driver, a header unit, and a stage. The pattern storing unit stores data on light guide patterns of a discontinuous straight line shape. The controller transmits position signal of the light guide patterns to the X-Y driver and simultaneously, transmits a switching signal to the laser oscillating unit. The laser oscillating unit outputs a laser beam synchronized with a movement of the header unit. The X-Y driver moves the header unit and the stage. The header unit moves along a first guide rail. The stage moves along a fixed second guide rail in the front and rear direction of the light guide panel.

4 Claims, 5 Drawing Sheets

APPARATUS FOR FORMING PATTERN USING LASER

CROSS REFERENCE

This application claims foreign priority under Paris Convention and 35 U.S.C. §119 to Korean Patent Application No. 10-2009-0062800, filed Jul. 10,2009 with the Korean Intellectual Property Office.

BACKGROUND OF THE INVENTION

1. Technical Field

The present invention relates to manufacturing a pattern of a light guide panel of a surface light source device used in a liquid crystal display device, a lighting signboard, a cellular phone, a telephone, a Personal Digital Assistant (PDA), a keyboard, an electronic calculator, etc. More particularly, the present invention relates to an apparatus for forming a pattern using a laser, for providing a uniform luminance characteristic by providing a phase difference of 90° between an odd number line and even number line of light guide patterns formed in a light guide panel.

2. Description of the Related Art

Commonly, a light guide panel, which is a plate for providing a path for uniformly scattering and diffusing light scanned from a light source, is being applied to a light receiving flat display device such as a liquid crystal display device, or a surface light source device used in a lighting signboard, etc.

FIG. 1 is a cross section schematically illustrating a conventional surface light source device.

Referring to FIG. 1, the conventional surface light source device 10 includes a light guide panel 11, a reflective sheet 12 installed below the light guide panel 11, a light source 13 installed at one side of the light guide panel 11, and a cover member 14 covering the light source 13. As the light source 13, a cold cathode fluorescent lamp, a Light Emitting Diode (LED), etc. can be used. In the light guide panel 11, a plurality of light guide patterns 15 are formed by using a bead-shaped Oxide Titanium (TiO$_2$) and ink including glass, acryl, etc. to scatter and diffuse light incident on one surface of a transparent acrylic resin. In the surface light source device 10, light irradiated from the light source 13 is incident on the light guide panel 11, and the incident light is guided through the light guide panel 11 as indicated by arrows. After that, the guided light is reflected at relatively uniform illumination in each part by the reflective sheet 12 and the light guide patterns 15. After that, the reflected light passes through a diffuse sheet 16 and again passes through a prism sheet 17 to direct toward the front.

Also, position and length information on each light guide pattern 15 to be formed in the light guide panel 11 are generally previously stored in a pattern storing module (not shown) of a pattern forming apparatus, and this information is read out from the pattern storing module (not shown) to form the light guide patterns 15. However, there is a problem that it is difficult to form the light guide pattern 15 of a uniform luminance characteristic due to several causes, for example, due to a data processing time for reading out and processing data stored in the pattern storing module (not shown), a data delivery time, a rise time delay of a laser, a clearance of a driving motor, etc. Particularly, this problem can come into question as the light guide panel 11 is large-sized.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide an apparatus for forming a pattern using a laser, for providing a uniform luminance characteristic, by controlling to provide a predetermined phase difference between an odd number line and even number line of light guide patterns formed in a light guide panel.

Another aspect of exemplary embodiments of the present invention is to provide an apparatus for forming a pattern using a laser, for improving the productivity of light guide patterns, by fixing a plurality of light guide panels to a stage and forming the light guide patterns.

According to one aspect of the present invention, an apparatus for forming a pattern using a laser is provided. The apparatus includes a pattern storing unit, a controller, a laser oscillating unit, an X-Y driver, a header unit, and a stage. The pattern storing unit stores data on light guide patterns of a discontinuous straight line shape to be formed in a light guide panel. The controller reads out position signals of the light guide patterns to be formed in the light guide panel from the pattern storing unit and transmits the read-out position signal to the X-Y driver and simultaneously, transmits a switching signal, which is generated on the basis of length information of the light guide patterns, to the laser oscillating unit. The laser oscillating unit outputs a laser beam synchronized with a movement of the header unit, on the basis of the switching signal received from the controller. The X-Y driver moves the header unit and the stage on the basis of the position signal received from the controller. The header unit moves along a first guide rail in the left and right direction of the light guide panel by way of the X-Y driver, and forms the light guide patterns in the light guide panel by vertically downwardly reflecting and concentrating the laser beam output from the laser oscillating unit. The stage moves along a fixed second guide rail in the front and rear direction of the light guide panel by way of the X-Y driver, and fixes the light guide panel. The controller controls to provide a predetermined phase difference between an odd number line and even number line of the light guide patterns by adding a predetermined calibration value to X coordinates of position signals of the light guide patterns read out from the pattern storing unit, and the control is performed for at least one or more of the odd number line and the even number line.

The stage is a stage capable of fixing a plurality of light guide panels.

The predetermined calibration value is within a range of +2 mm to −2 mm.

The predetermined phase difference is equal to 90°.

BRIEF DESCRIPTION OF THE DRAWINGS

The above and other objects, features and advantages of the present invention will become more apparent from the following detailed description when taken in conjunction with the accompanying drawings in which.

Throughout the drawings, the same drawing reference numerals will be understood to refer to the same elements, features and structures.

DESCRIPTION OF SPECIFIC EMBODIMENTS

Exemplary embodiments of the present invention will now be described in detail with reference to the annexed drawings. In the following description, a detailed description of known functions and configurations incorporated herein has been omitted for conciseness.

Figure 1:
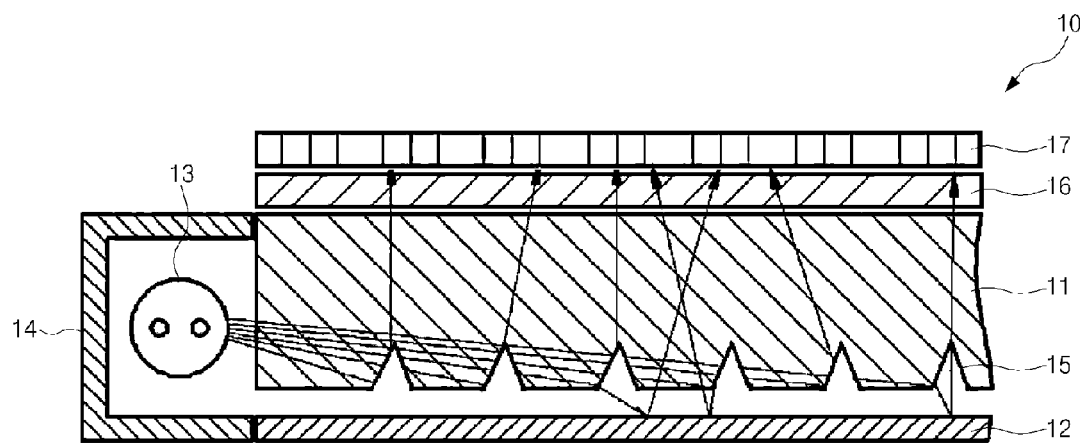
FIG. 1 is a diagram illustrating a conventional surface light source device.
Figure 2:
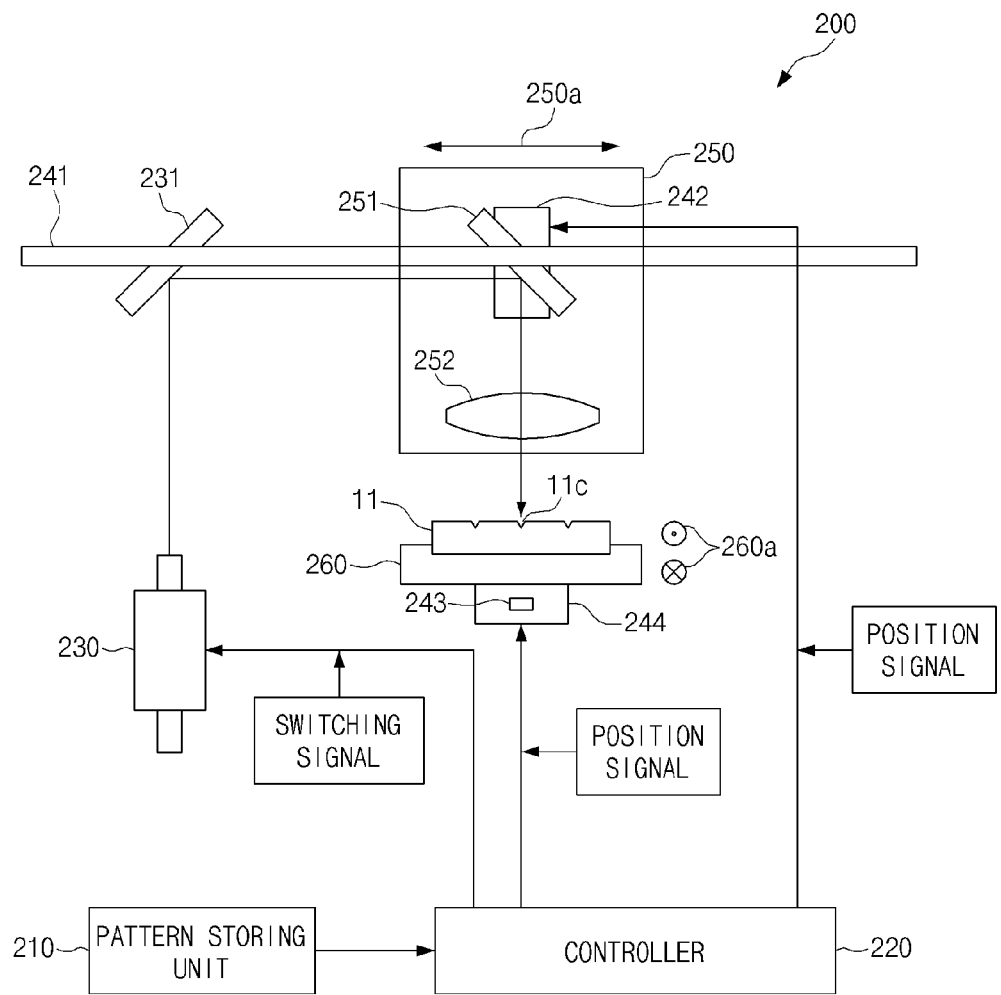
FIG. 2 is a diagram illustrating the whole construction of an apparatus for forming a pattern using a laser according to an exemplary embodiment of the present invention.

FIG. 2 is a diagram illustrating the whole construction of an apparatus for forming a pattern using a laser according to an exemplary embodiment of the present invention. The apparatus 200 includes a pattern storing unit 210, a controller 220, a laser oscillating unit 230, an X driver (i.e., a first driver) 242, a Y driver (i.e., a second driver) 244, a header unit 250, and a stage 260.

Referring to FIG. 2, the pattern storing unit 210 stores data on light guide patterns 11c of a discontinuous straight line shape to be formed in a light guide panel 11. In detail, the light guide patterns data can include position signal (i.e., X and Y coordinates) and length information on each light guide pattern 11c.

The controller 220 transmits a position signal of each light guide pattern 11c (specifically, a position signal including an X coordinate of each light guide pattern 11c read out from the pattern storing unit 210) to the first driver 242, and transmits a position signal including a Y coordinate of each light guide pattern 11c to the second driver 244. Also, the controller 220 generates a switching signal for oscillating the laser oscillating unit 230 on the basis of the length information of the light guide pattern 11c read out from the pattern storing unit 210, and transmits the generated switching signal to the laser oscillating unit 230.

The laser oscillating unit 230 outputs a laser beam synchronized with a movement of the header unit 250, on the basis of the switching signal received from the controller 220.

The X-Y drivers 242 and 244 can include the first driver 242 for moving the header unit 250 in horizontal direction 250a along a first guide rail 241, and the second driver 244 for moving the stage 260 in front and rear direction 260a along a second guide rail 243. The first and second drivers 242 and 244 can be realized by a linear motor, for example, but they are not necessarily limited to the linear motor.

The header unit 250 is integrally comprised of a second mirror 251 and a lens 252. The second mirror 251 vertically downwardly reflects a laser beam reflected by a first mirror 231. The lens 252 forms the light guide patterns 11c by concentrating the laser beam reflected by the second mirror 251, on a surface of the light guide panel 11.

The stage 260 moves along the fixed second guide rail 243 in the front and rear direction 260a of the light guide panel 11 by way of the second driver 244, and fixes the light guide panel 11.

A process of forming the light guide patterns using the above-constructed pattern forming apparatus 200 is described below in detail.

Referring to FIG. 2, the controller 220 reads out a position signal of the light guide pattern 11c to be formed in the light guide panel 11 (i.e., both a position signal including an X coordinate of each light guide pattern 11c and a position signal including a Y coordinate of each light guide pattern 11c) from the pattern storing unit 210, and transmits the read-out position signal to the first and second drivers 242 and 244, respectively. Also, the controller 220 generates a switching signal for oscillating the laser oscillating unit 230 on the basis of length information of the light guide pattern 11c read out from the pattern storing unit 210, and transmits the generated switching signal to the laser oscillating unit 230.

After that, on the basis of the switching signal received from the controller 220, the laser oscillating unit 230 outputs a laser beam synchronized with a movement of the header unit 250. Next, the output laser beam is reflected from the first mirror 231 coupled with the first guide rail 241 toward the header unit 250. After that, the laser beam is reflected and concentrated by the second mirror 251 and lens 252 of the header unit 250 to form the light guide pattern 11c in the surface of the light guide panel 11.

Figure 3:
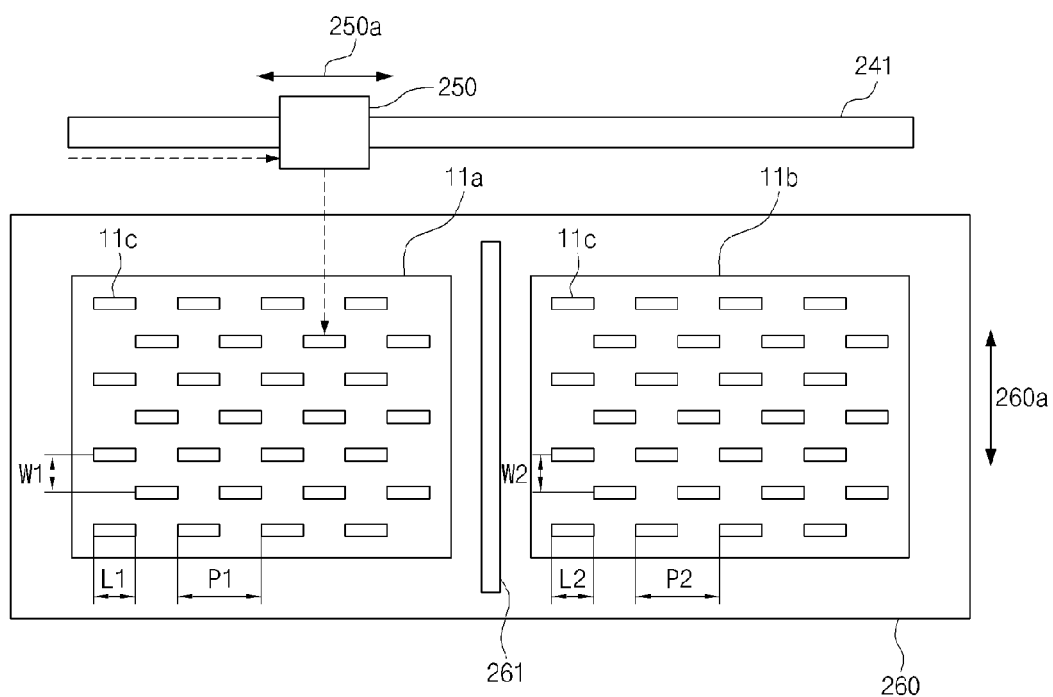
FIG. 3 is a diagram illustrating a dual stage capable of fixing two light guide panels according to an exemplary embodiment of the present invention.

FIG. 3 is a diagram illustrating a dual stage capable of fixing two light guide panels according to an exemplary embodiment of the present invention.

Referring to FIG. 3, the stage 260 can fix two light guide panels (e.g., a first light guide panel 11a and a second light guide panel 11b) at the left and right sides of a separating plate 261, respectively. According to an exemplary embodiment, the number of light guide panels fixed to the stage 260 may be a plural number of '3' or more in addition to '2' illustrated in FIG. 3.

On the other hand, in FIG. 3, light guide patterns 11c formed by reflecting and concentrating light in the header unit 250 are illustrated. The light guide patterns 11c are composed of a plurality of lines. In each line, the light guide patterns 11c of a discontinuous straight line shape are formed. In FIG. 3, reference numeral 'L1' denotes a length of each light guide pattern 11c formed in the first light guide panel 11a, 'P1' denotes a pitch between the light guide patterns 11c of the horizontal direction 250a, and 'W1' denotes an interval between the light guide patterns 11c of the front and rear direction 260a. Also, reference numeral 'L2' denotes a length of each light guide pattern 11c formed in the second light guide panel 11b, 'P2' denotes a pitch between the light guide patterns 11c of the horizontal direction 250a, and 'W2' denotes an interval between the light guide patterns 11c of the front and rear direction 260a. As illustrated in FIG. 3, it can be L1=L2, P1=P2, and W1=W2. According to an exemplary embodiment, the light guide patterns 11c may be formed such that a length of the light guide pattern 11c of any one light guide panel 11a is constructed longer as given by L1>L2, P1=P2, and W1=W2.

Figure 4:
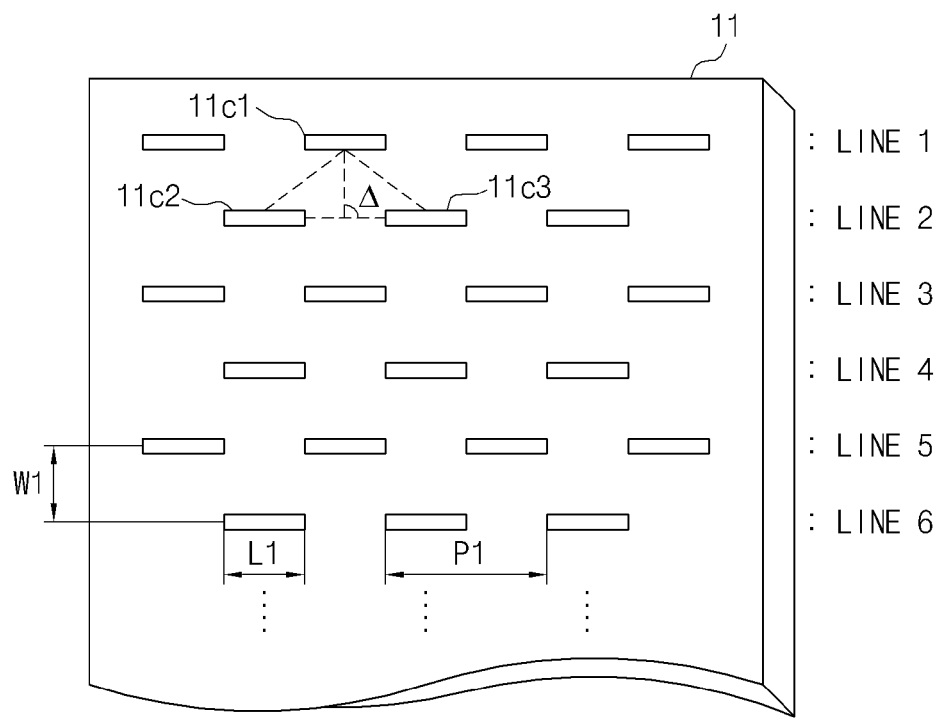
FIG. 4 is a diagram illustrating light guide patterns formed according to an exemplary embodiment of the present invention.
Figure 5:
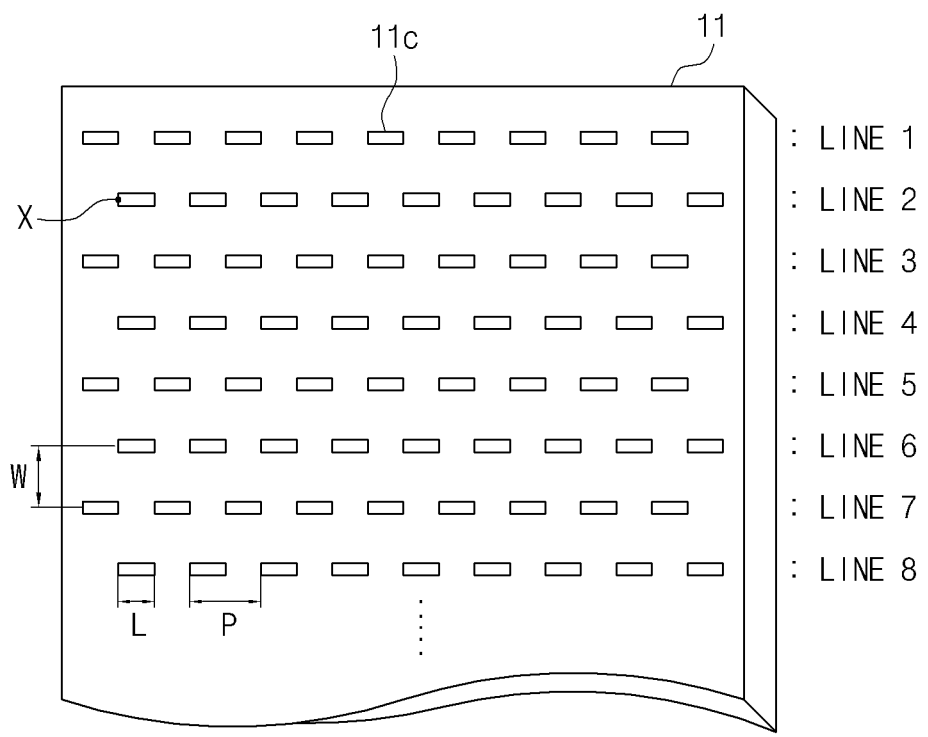

FIG. 4 is a diagram illustrating light guide patterns formed according to an exemplary embodiment of the present invention.

Referring to FIGS. 2 and 4, position and length information on each light guide pattern 11c to be formed in the light guide panel 11 are generally previously stored in the pattern storing unit 210 of the pattern forming apparatus, and these information are read out from the pattern storing unit 210 to form the light guide patterns 11c. However, there is a problem that it is difficult to form the light guide pattern 11c of a uniform luminance characteristic due to several causes, for example, due to a data processing time for reading out and processing data stored in the pattern storing module (not shown), a data delivery time, a rise time delay of a laser, a clearance of a driving motor, etc. Particularly, this problem can come into question as the light guide panel 11 is large-sized.

In order to solve this problem, in the present invention, the controller 220 controls to provide a predetermined phase difference between an odd number line and even number line of the light guide patterns 11c formed in the light guide panel 11. In one exemplary embodiment, as illustrated in FIG. 4, the controller 220 controls such that an angle ($\Delta$) between lines connecting between a center of a light guide pattern 11c1 of one line and centers of light guide patterns 11c2 and 11c3 of a next line is equal to 90°. The present invention is designed to provide the predetermined phase difference of 90°. However, this is only one exemplary embodiment and it should be noted that various modifications of an angle range including 90° (e.g., 80° to 100°), etc. will be possible according to need. In another exemplary embodiment, the controller 220 controls to provide a phase difference of 90° between an odd number line and even number line of light guide patterns 11$c$ by adding a predetermined calibration value to X coordinates of position signals of the light guide patterns 11$c$ read out from the pattern storing unit 210. The control is performed for at least one or more of the odd number line and the even number line. This calibration value is within a range of +2 mm to −2 mm. By calibration for at least one or more of the odd number line and the even number line, the present invention can maintain the phase difference of 90° between the odd number line and even number line. Due to this, there is an effect of being capable of providing a uniform luminance characteristic.

As described above, by controlling to provide a predetermined phase difference between an odd number line and even number line of light guide patterns formed in a light guide panel, the present invention can provide a uniform luminance characteristic.

Also, by fixing a plurality of light guide panels to a stage to form light guide patterns, the present invention can improve the productivity of the light guide patterns.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for forming a pattern using a laser, the apparatus comprising:

a pattern storing unit for storing data on light guide patterns of a discontinuous straight line shape to be formed in a light guide panel;

a controller for reading out position signals of the light guide patterns to be formed in the light guide panel, from the pattern storing unit, and transmitting the read-out position signals to an X-Y driver and simultaneously, transmitting a switching signal, which is generated on the basis of length information of the light guide patterns, to a laser oscillating unit;

the laser oscillating unit for outputting a laser beam synchronized with a movement of a header unit, on the basis of the switching signal received from the controller;

the X-Y driver for moving the header unit and a stage, on the basis of the position signals received from the controller;

the header unit moving along a first guide rail in the left and right direction of the light guide panel by way of the X-Y driver, and forming the light guide patterns in the light guide panel by vertically downwardly reflecting and concentrating the laser beam output from the laser oscillating unit; and the stage moving along a fixed second guide rail in the front and rear direction of the light guide panel by way of the X-Y driver, and fixing the light guide panel, wherein the controller controls to provide a predetermined phase difference between an odd number line and even number line of the light guide patterns by adding a predetermined calibration value to X coordinates of position signals of the light guide patterns read out from the pattern storing unit, and the control is performed for at least one or more of the odd number line and the even number line.

2. The apparatus of claim 1, wherein the stage is a stage capable of fixing a plurality of light guide panels.

3. The apparatus of claim 1, wherein the predetermined calibration value is within a range of +2 mm to −2 mm.

4. The apparatus of claim 1, wherein the predetermined phase difference is equal to 90°.

\* \* \* \* \*